United States Patent
Wang et al.

(10) Patent No.: US 6,621,593 B1
(45) Date of Patent: Sep. 16, 2003

(54) SCAN LINE NON-LINEARITY CORRECTION USING AN ASPHERIC ELEMENT IN A ROS SYSTEM

(75) Inventors: Mark Shi Wang, Irvine, CA (US); Chia-di Lee, Torrance, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/410,812

(22) Filed: Oct. 1, 1999

(51) Int. Cl.[7] .............................................. G06K 15/00
(52) U.S. Cl. ......................................... 358/1.7; 358/1.1
(58) Field of Search ............................ 358/1.1, 1.7, 1.9, 358/505, 474, 475, 481; 347/224, 225, 230, 231, 232, 233, 234, 256, 258, 260, 261; 359/203, 205, 225, 226

(56) References Cited

U.S. PATENT DOCUMENTS

| | | | |
|---|---|---|---|
| 5,550,668 A | * 8/1996 | Appel et al. | 359/204 |
| 5,821,971 A | 10/1998 | Rauch et al. | 347/134 |
| 5,889,545 A | 3/1999 | Rauch et al. | 347/134 |

* cited by examiner

*Primary Examiner*—Arthur G. Evans
(74) *Attorney, Agent, or Firm*—William Propp

(57) ABSTRACT

An aspheric optical element corrects the non-linearity of the scan line in a ROS. The optical element can be either the wobble correction mirror, the last optical element in the ROS, or the output window, subsequent to the ROS. The optical element deflects the scan beam to cancel the non-linearity of the scan line caused by the residual errors in the ROS lens design. The aspheric optical element can also correct scan line bow.

8 Claims, 3 Drawing Sheets

SCAN LINE NON-LINEARITY CORRECTION USING AN ASPHERIC ELEMENT IN A ROS SYSTEM

BACKGROUND OF THE INVENTION

The present invention relates to scan line non-linearity in a Raster Output Scanning (ROS) system and, more particularly, to an aspheric output window or aspheric mirror in the ROS system to correct the scan line non-linearity.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. This laser beam is modulated in conformance with the image information. The modulated beam is transmitted through a lens onto a scanning element, typically a rotating polygon having mirrored facets.

The light beam is reflected from a facet of the rotating polygon mirror and thereafter is focused to a "spot" on the photosensitive member. The rotation of the polygon causes the spot to scan across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper.

The raster output scanner has various optical components of mirrors and lenses to collimate, expand, focus and align the modulated scanning beam. These optical components are fixedly mounted within a housing frame, which is positioned within a printer machine frame, so that the modulated and shaped scanning beam emerging from an output window in the housing is directed in a scan line which is perpendicular to the photoreceptor surface. The lines will be formed in parallel across the surface of the photoreceptor belt.

One problem inherent in the optical system of a ROS is "scan linearity". Scan linearity is the measure of how equally spaced the spots are written in the scan direction across the entire scanline. Typical scan linearity curves start at zero position error at one end of a scan having a positive lobe of position error across the scanline, cross the center of scan with zero position error and then have a negative lobe of position error across the remainder of the scanline toward the other end of the scan. Scan linearity curves may have image placement errors of zero at several locations across the scanline. Ideally, the curve would be at zero across the entire scanline.

The main function of the f-theta lens group between the rotating polygon mirror and the photoreceptor is to control the scan linearity, in terms of uniform spot displacement per unit angle of polygon rotation.

Bow distortions occur for a scanning beam in a ROS from the unavoidable imprecisions in the manufacture and mounting of the lenses and mirrors of the optical elements of the ROS. Scanline bow arises from the very nature of optical scanning systems, where the beam is offset in the cross-scan direction from the ideal horizontal straight line in the scan direction of the scan line on the recording medium. The scanline bow occurs because the magnification of the optical system of the ROS varies across the cross-scan direction as the beam propagates through the optical system.

Depending upon the accumulation of optical tolerances, the bow may bend in the middle of the scan line about a central mid-point in either cross-scan direction. A bow where the central mid-point is higher than the rest of the scan line is called a "frown" while a bow where the central mid-point is lower than the rest of the scan line is called a "smile".

Scanline bow arises in both single and multiple beam ROS's and is the overall curvature of the scan line relative to the ideal of a straight scan line.

In a multiple beam ROS system, each light source emitting a beam has its own bow curve. It is the maximum difference in the bow curves between the multiple light sources in a given system that defines the "differential bow".

A plurality of ROS units can be used in a color xerographic ROS printer. Each ROS forms a scan line for a separate color image on a common photoreceptor belt. Each color image is developed in overlying registration with the other color images from the other ROS units to form a composite color image which is transferred to an output sheet. Registration of each scan line of the plurality of ROS units requires each image to be registered to within a 0.1 mm circle or within a tolerance of ±0.05 mm.

One solution to error in registration of the scan line is to rotate the output window of the ROS, as taught in U.S. Pat. No. 5,821,971 and U.S. Pat. No. 5,889,545, both commonly assigned as the present application and both hereby incorporated by reference. The transmissive output window has no optical power. However, rotation of the output window only rotates the beam uniformally along the entire scan line.

Another solution to scan line registration error is to twist the output window in the ROS system to create the required deflection of the projected scan line, as taught in pending U.S. patent application Ser. No. 09/219,004, commonly assigned as the present application and hereby incorporated by reference. Once again the transmissive output window has no optical power.

It is an object of the present invention to correct non-linearity of the scan line in a ROS by using an aspheric output window or aspheric mirror.

It is another object of the present invention to correct bow of the scan line and non-linearity of the scan line in a ROS by using an aspheric output window or aspheric mirror.

SUMMARY OF THE INVENTION

According to the present invention, an aspheric optical element corrects the non-linearity of the scan line in a ROS. The optical element can be either the wobble correction mirror, the last optical element in the ROS, or the output window, subsequent to the ROS. The optical element deflects the scan beam to cancel the non-linearity of the scan line caused by the residual errors in the ROS lens design. The aspheric optical element can also correct scan line bow.

Other objects and attainments together with a fuller understanding of the invention will become apparent and appreciated by referring to the following description and claims taken in conjunction with the accompanying drawings.

DESCRIPTION OF THE INVENTION

Figure 1:
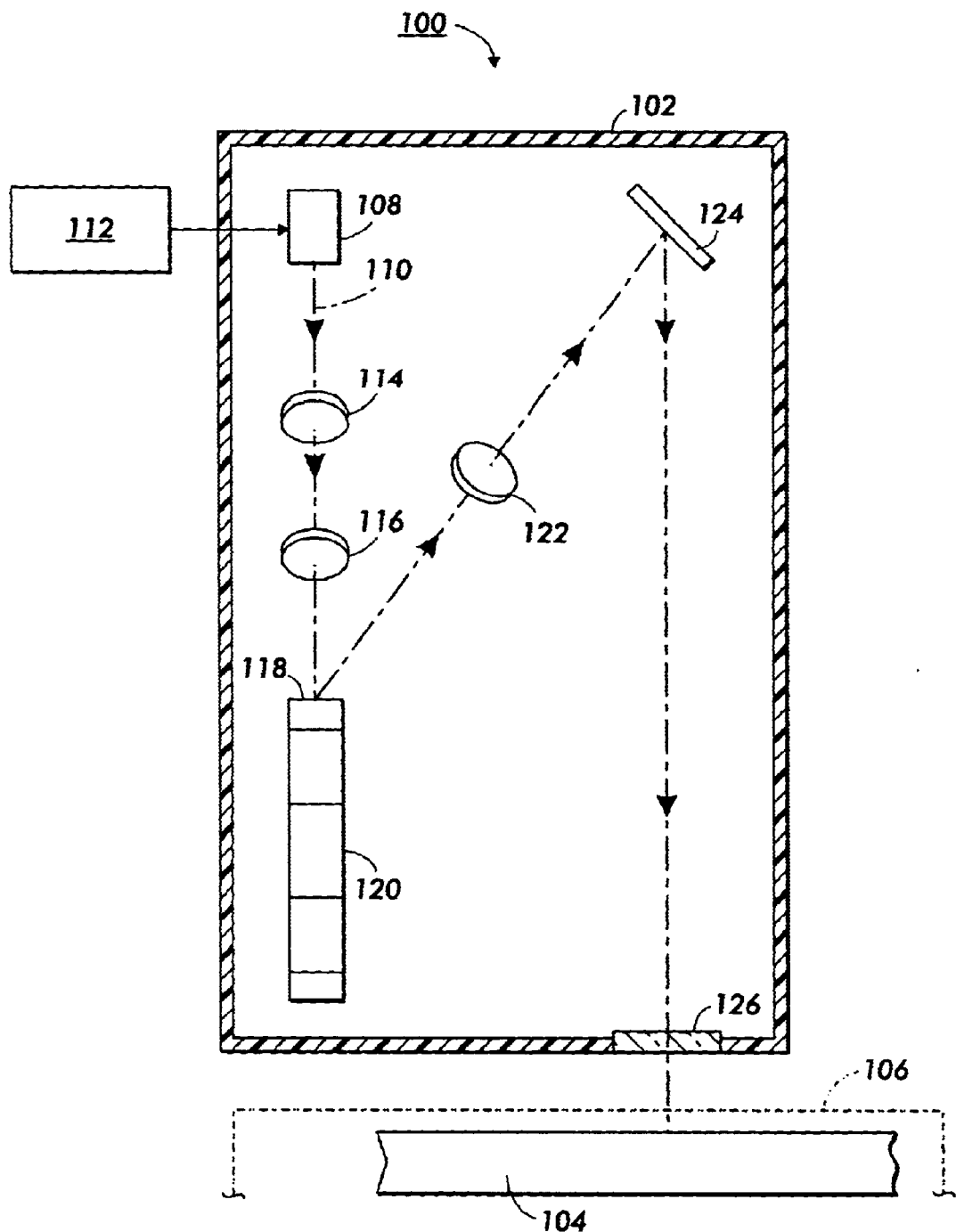
FIG. 1 is an interior sectional view of the ROS housing and the optical components contained therein.

Referring now to FIG. 1, the Raster Output Scanner (ROS) unit 100 consists of a modular housing 102, within which are mounted the optical components which generate the scan lines at the surface of the photoreceptor 104, housed in print module 106.

The ROS 100 of FIG. 1 has a laser light source 108 for producing a diverging beam of coherent light 110, which is modulated in conformance with the image information contained in the video signal sent from image output control 112.

The diverging light beam 110 is collimated by a spherical lens 114. The collimated light beam 110 is then focused by a cylindrical lens 116 onto one of a plurality of facets 118 of the rotating polygon mirror 120.

The light beam 110 is then reflected by the facet 118 to pass through f-theta compound spherical lens 122 and reflect off cylindrical wobble correction mirror 124. The f-theta lenses 122 and cylindrical mirror 124 focus the light beam 110 through the output window 126 to a circular or elliptical "spot" in a scan line on the photoreceptor 104. The output window is wide enough to encompass the scanning of the light beam over one scan line. The output window 126 is typically part of the modular housing 102.

The compound spherical lenses 122 and cylindrical mirror 124 also produce a linear scan of constant spot size and velocity over the length of the scan line (f-theta correction). The cylindrical mirror 124 further corrects for wobble (scanner motion or facet errors) of the scanning spot light beam 110 on the photoreceptor 104 as is known in the art.

The rotation of the polygon mirror 120 causes the reflected light beam 110 spot to scan linearly across the photoreceptor 104 in a fast scan (i.e., line scan) direction.

The light beam 110 is intensity-modulated at the laser source 108 in accordance with an input image serial data stream at a rate such that individual picture elements ("pixels") of the image represented by the data stream are exposed on the photoreceptor 104.

Fold mirrors to direct the light beam within the confines of the modular housing 102 are not shown in FIG. 1. These fold mirrors have no optical power and merely serve to change the direction of the light beam.

Figure 2:
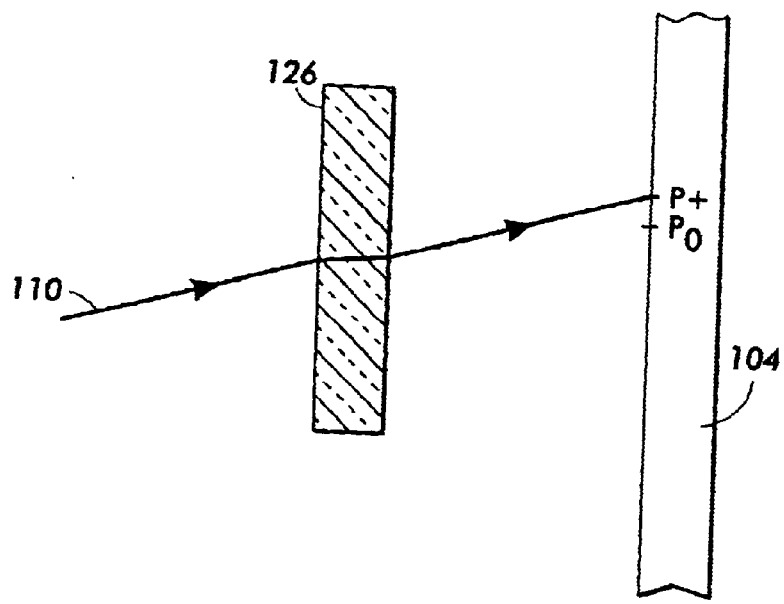
FIG. 2 is a schematic side view of an output window with no optical power.

In the prior art as shown in FIG. 2, the output window 126 has no optical power. The scanning light beam 110 will pass straight through the output window 126 to position P0 on the surface of the photoreceptor 104. The ideal position for the light beam for a linear scan line is shown as P0 on the surface of the photoreceptor 104.

Figure 3:
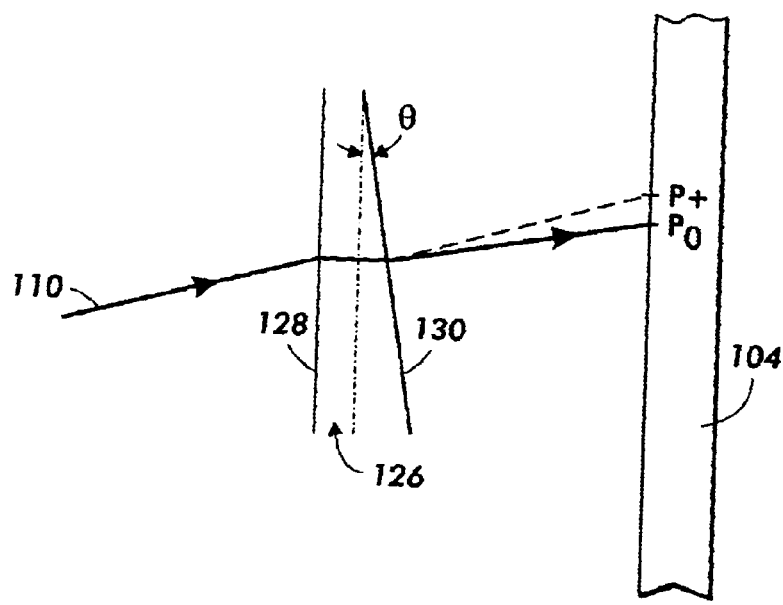
FIG. 3 is a schematic side view of an aspheric output window for a raster output scanner of the present invention.

In the present invention, the output window 126 does have optical power. The output window is aspheric. Thus, as shown in FIG. 3, the output window 126 is formed of an optically transmissive material, such as plastic or glass, with an index of refraction, n. The input surface 128 of the output window 126 is parallel to the surface of the photoreceptor 104 while the output surface 130 of the output window 126 is tilted at an angle θ to the input surface 128 and the photoreceptor surface 104. The output window does not have a uniform thickness and the output surface is sloped. As noted in FIG. 1, the output window is in the optical path of the ROS, subsequent to the ROS unit 100 and subsequent to the f-theta lenses 122 and wobble correction mirror 124, but prior to the photoreceptor 104.

The output window of FIG. 3 deflects the projected scan line to compensate for the residual lens design errors of the ROS. The scanning light beam 110 will pass through the output window 126 to be deflected from actual position P+ on the surface of the photoreceptor 104 to the ideal position P0 on the surface of the photoreceptor 104.

Based on the law of refraction applied to each surface of the window, angling the slope of the output surface of the output window decreases the optical path of the light beam through the optical window. Accordingly, the exiting light beam from the output window is deflected relative to the input light beam based on the angle, thickness and refractive index of the output window. The light beam exits offset and the position of the beam on the photoreceptor is altered. The light beam can be adjusted and corrected back to the ideal scan line. The light beam is displaced from the nominal position P+ to position P0 as a result of a controlled angular slope of the output window by the angle θ.

An approximate surface profile of the output window is $$S(y) = ?E(y)/(n-1)/D \, dy \qquad \text{Equation 1}$$

where 0 to y is the limit of the integration, S(y) is the surface profile at position y, E(y) is the scan error function mapped onto the output plane 130 of the output window 126, n is the refractive index of the output window 126 and D is the distance from the output window 126 to the photoreceptor plane 104.

The displacement of the beam along the photoreceptor can be calculated from equations (2) and (3):

$$d(z) = t \sin(z) [1 - \cos(z)/n \cos(z1)] \qquad \text{Equation 2}$$

where d(z) is the displacement of the beam along the photoreceptor, t is the thickness of the window, n is the index of refraction of the output window and z1 is defined in equation 3 as the slope angle of the output window.

$$z1 = \sin^{-1}[(n \sin(z))] \qquad \text{Equation 3}$$

The displacement can likewise be made to position P− by angling the output window by the angle θ in the opposite direction or −θ.

Figure 4:
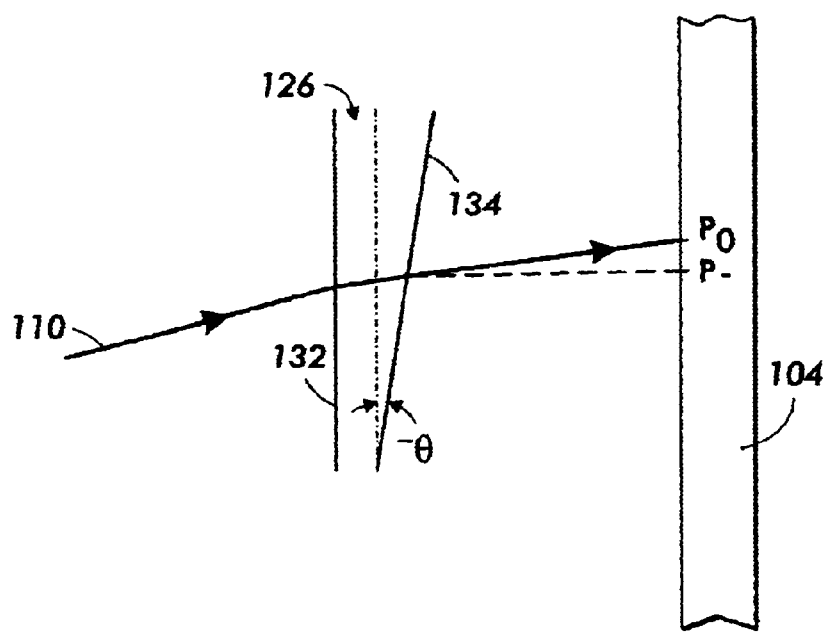
FIG. 4 is a second schematic side view of an aspheric output window for a raster output scanner of the present invention.

As shown in FIG. 4, the output window 126 is formed of an optically transmissive material, such as plastic or glass, with an index of refraction, n. The input surface 132 of the output window 126 is parallel to the surface of the photoreceptor 104 while the output surface 134 of the output window 126 is tilted at an angle −θ to the input surface 132 and the photoreceptor surface 104. The output window does not have an uniform thickness and the output surface is sloped.

The output window of FIG. 4 deflects the projected scan line to compensate for the residual lens design errors of the ROS. The scanning light beam 110 will pass through the output window 126 to be deflected from actual position P− on the surface of the photoreceptor 104 to the ideal position P0 on the surface of the photoreceptor 104.

Based on the law of refraction applied to each surface of the window, angling the slope of the output surface of the output window increases the optical path of the light beam through the optical window. Accordingly, the exiting light beam from the output window is deflected relative to the input light beam based on the angle, thickness and refractive index of the output window. The light beam exits offset and the position of the beam on the photoreceptor is altered. The light beam can be adjusted and corrected back to the ideal scan line. The light beam is displaced from the nominal position P− to position P0 as a result of a controlled angular slope of the output window by the angle −θ.

The output window shown in FIGS. 3 and 4 are along a single point in the x position of the output window. For each point or segment along the output window, the appropriate deflection of the scanning light beam is calculated to deflect the beam to the appropriate linear scan line on the photoreceptor. The point or segments are combined along the full length of the output window forming a curve in the x direction and a sloped slanting surface in the y direction which yields an aspheric optical element.

This present invention corrects scan line non-linearity in a ROS by deflecting the beam by different amounts along the entire scan line, rather than rotating the beam uniformally along the entire scan line.

The output window is the last optical component of the ROS. The output window usually does not have optical power. The output window is not in the focal plane of the ROS. The output window is a standard component of the ROS housing and thus is not an additional optical component of the printer system.

Figure 5:
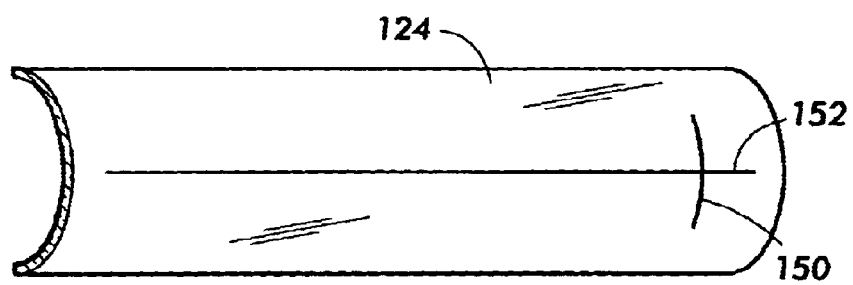
FIG. 5 is a perspective view of a wobble correction mirror for a raster output scanner of the present invention.

The wobble correction mirror 124 of FIG. 1 as shown in FIG. 5 has optical power in one direction 150 and no optical power in the perpendicular direction 152. The wobble correction mirror can be modified to correct for scan line non-linearity using the method of FIG. 3 and FIG. 4 and accompanying text.

In the present embodiment of the invention, the wobble correction mirror 124 will have optical power along the direction 152. The wobble correction mirror will be aspheric along that direction. The thickness of the mirror will vary along the wobble correction mirror along the direction 152. The wobble correction mirror will not have a uniform thickness along the direction 152 and the surface will be sloped. The thicknesses will be uniform however along the optical power direction 150 of the wobble correction mirror.

As noted in FIG. 1, the wobble correction mirror is subsequent to the f-theta lenses 122 but prior to the output window 126 and prior to the photoreceptor 104. In this embodiment of FIG. 5, the output window will have no optical power and thus not effect the scanning light beam.

The wobble correction mirror of FIG. 5 deflects the projected scan line to compensate for the residual lens design errors of the ROS. The scanning light beam will be reflected from the wobble correction mirror (and pass through the output window) to be deflected from actual position on the surface of the photoreceptor to the ideal position on the surface of the photoreceptor.

Although the invention has been shown in a single pass embodiment, it can also be practiced in a multi-ROS highlight color system where two single ROS imagers; e.g., in FIG. 2, ROS imager 100, are used to form each image.

While the invention has been described with reference to the structures disclosed, it is not confined to the details set forth, but is intended to cover such modifications or changes as they come within the scope of the following claims.

What is claimed is:

1. An imaging system to provide scan line linearity including;

a photoreceptor means, a raster output scanner for forming a scan line across said photoreceptor means, an aspheric transmissive optical element between said raster output scanner and said photoreceptor means, to deflect said scan line to correct for optical errors of said raster output scanner wherein said aspheric transmissive optical element is shaped by post-polygon optics such that non-linearity is improved.

2. The imaging system of claim 1 wherein the output surface of said aspheric transmissive optical element is at an angle relative to the input surface of said aspheric transmissive optical element to deflect said scan line to correct for optical errors of said raster output scanner.

3. The imaging system of claim 1 wherein said aspheric transmissive optical element is the output window of said raster output scanner.

4. The imaging system of claim 1 wherein said aspheric transmissive optical element is the wobble correction mirror of said raster output scanner.

5. In a raster output scanning (ROS) optical system of a light source for emitting a light beam, optical means for focusing said light beam upon facets of a rotating polygon mirror, said facets scanning said light beam through focusing optical means along a scan line of a photosensitive medium, an improvement for providing scan line linearity comprising an aspheric transmissive optical element between said optical means and said photosensitive medium, to deflect said scan line to correct for optical errors of said optical means wherein said aspheric transmissive optical element is shaped by post-polygon optics such that non-linearity is improved.

6. In the raster output scanning (ROS) optical system of claim 5, wherein the output surface of said aspheric transmissive optical element is at an angle relative to the input surface of said aspheric transmissive optical element to deflect said scan line to correct for optical errors of said optical means.

7. In a raster output scanning (ROS) optical system of claim 5, wherein said aspheric transmissive optical element is the output window of said raster output scanning (ROS) optical system.

8. In a raster output scanning (ROS) optical system of claim 5, wherein said aspheric transmissive optical element is the wobble correction mirror of said raster output scanning (ROS) optical system.

* * * * *